June 6, 1961   E. D. SMYSER   2,986,838
COMBINATION SINKER AND BASS PLUG
Filed Jan. 16, 1959

INVENTOR.
ELMER D. SMYSER
BY *Victor J. Evans & Co.*
ATTORNEYS

United States Patent Office 2,986,838
Patented June 6, 1961

2,986,838
COMBINATION SINKER AND BASS PLUG
Elmer D. Smyser, 808 Babruin Road, Bakersfield, Calif.; Clifford Smyser, executor of said Elmer D. Smyser, deceased, assignor to Julia Mae Smyser
Filed Jan. 16, 1959, Ser. No. 787,248
1 Claim. (Cl. 43—42.36)

This invention relates to fishing equipment, and more particularly to a combined sinker and bass plug.

The object of the invention is to provide a device which can be used for various purposes when fishing, as for example the device can be used as a sinker, bass plug or the like.

Another object of the invention is to provide a combination sinker and bass plug which is adapted to be conveniently retrieved even though the fishhook may become snagged on a rock or the like, so that loss of equipment will be minimized or prevented.

A still further object of the invention is to provide a combination sinker and bass plug which permits of a plurality of different uses thereof, so that different types of accessories such as feathers, bucktails or the like can be used when desired, and wherein the device can be arranged so that it will move through the water with different movements so as to be highly attractive to fish and wherein the angular position of the device can be changed or varied as desired.

A further object of the invention is to provide a combination sinker and bass plug which is extremely simple and inexpensive to manufacture.

Other objects and advantages will be apparent during the course of the following description.

In the accompanying drawings, forming a part of this application, and in which like numerals are used to designate like parts throughout the same.

Figure 1:
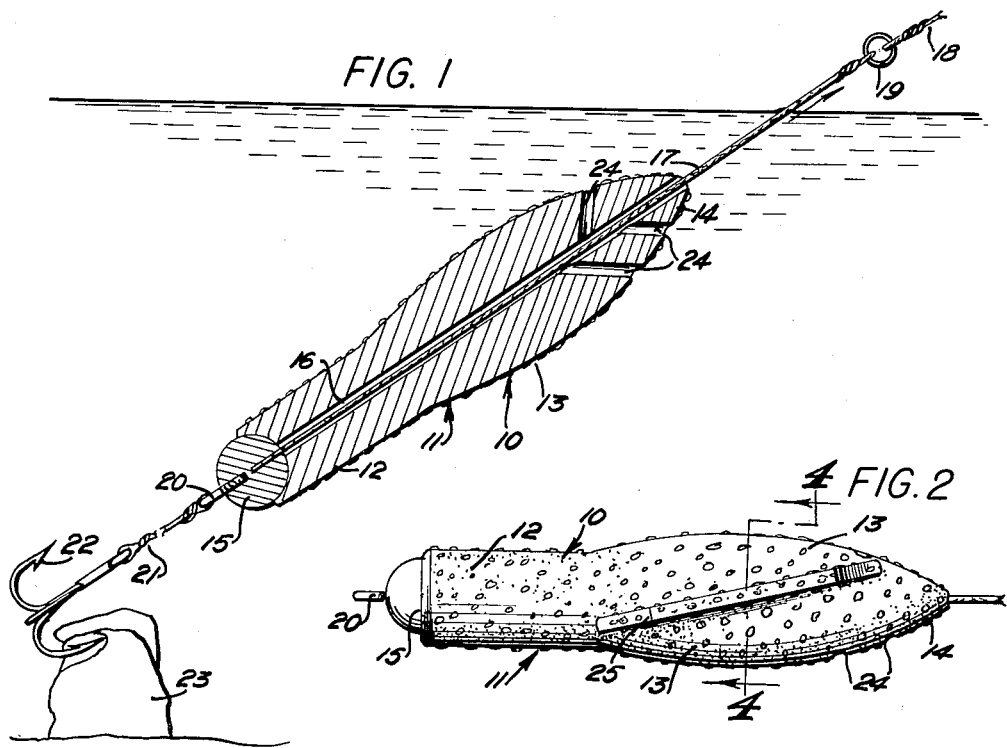
FIGURE 1 is a longitudinal sectional view illustrating the device being used.

Referring in detail to the drawings, the numeral 10 indicates the combination sinker and bass plug of the present invention which is shown to comprise a body member that is indicated generally by the numeral 11. The body member 11 includes a rearwardly disposed cylindrical portion 12 as well as a forwardly disposed tapered rounded portion 13 and a pointed front end 14. A spherical weight 15 is mounted in the rear end of the body member 11.

The body member 11 is provided with a longitudinally extending bore or passageway 16, and the numeral 17 indicates a first line or cable which extends through the bore 16 and which has its rear end suitably secured to the weight 15. The front end of the line 17 is adapted to be connected to a fishing line 18 as at 19.

Extending rearwardly from the weight 15 and connected thereto is an eye member 20, and a second line 21 is connected to the eye member 20. The first line 17 is stronger than the line 21 so that in the event that the fishhook 22 which is connected to the line 21, becomes snagged on a rock such as the rock 23 or other member 23, the line 21 will break before the line 17 will break so that the member 11 can be retrieved.

Figure 5:
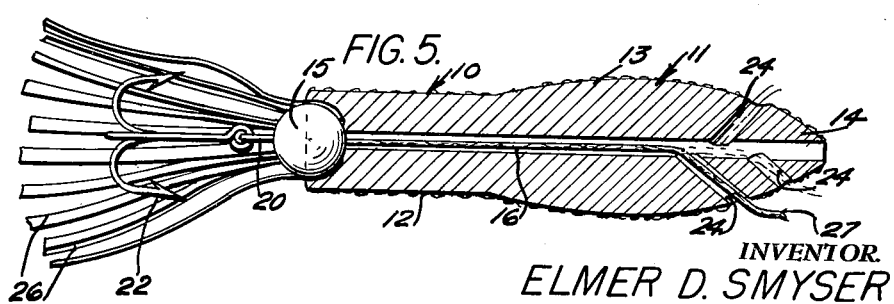
FIGURE 5 is a longitudinal sectional view illustrating a modification.

There is provided in the front portion of the member 11 a plurality of angularly arranged spaced apart openings 24 which communicate with the bore 16 so that as for example as shown in FIGURE 5, the line such as the line 17 can be extended through different of these openings 24 so that the device will create different effects as it is drawn or pulled through the water.

The numeral 25 designates each of a pair of similar opposed wings which extend outwardly from the body member 11 and which are secured thereto or formed integral therewith. As shown in the drawings such as FIGURE 2, the wings 25 are offset with respect to the longitudinal axis of the member 11.

As shown in FIGURE 5, feathers or a bucktail 26 can be connected at the rear of the device, and the hook 22 may be fastened directly to the eye member 20 when desired so that with the parts arranged as shown in FIGURE 5 the member functions as a plug while in FIGURE 1, the member can function as a sinker.

From the foregoing, it is apparent that there has been provided a device which can be used in a multiplicity of different manners or fashions, and when using the device as shown in FIGURE 1 for example, the line 17 extends through the bore 16 and is connected to the weight 15. Then, with the line 17 connected to a fishing line such as the fishing line 18, it will be seen that as the device 11 moves through the water, the weight 15 will have a tendency to maintain the rear end of the device in depressed or lowered position. The line 21 which is connected to the eye member 20 can be used for supporting the hook 22 and the line 21 is not as strong as the line 17. Then, in the event that the hook 22 becomes snagged on a member such as a rock 23, the line 21 will break before the line 17 will break so that the member 11 can be retrieved so that loss of expensive or valuable equipment will be prevented.

Figure 2:
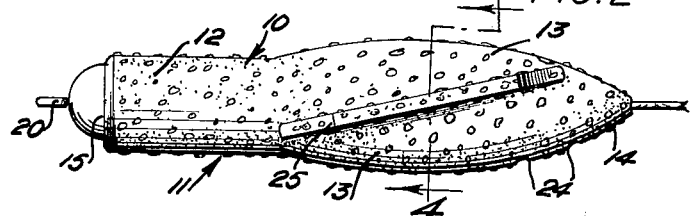
FIGURE 2 is an elevational view of the device.
Figures 3, 4:
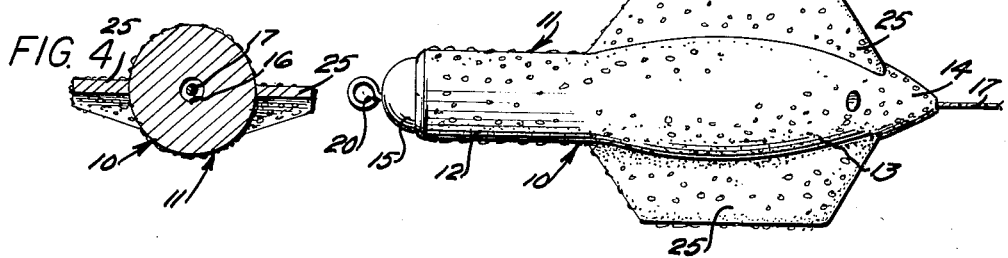
FIGURE 3 is a plan view of the device.
FIGURE 4 is a sectional view taken on the line 4—4 of FIGURE 2.

The exterior of the member 11 is adapted to be suitably decorated or colored so as to enhance the attractiveness thereof so that fish will be more readily attracted thereto. The wings 25 are offset or inclined as shown in FIGURE 2 so that as the device moves through the water it will assume the most advantageous positions.

If desired a line such as the line 17 can be extended through any of the openings 24 so that when the device is pulled through the water it will assume different angular positions as desired.

Furthermore, as shown in FIGURE 5 the feathers or bucktail 26 can be arranged around the hook 22 when the hook 22 is connected to the eye member 20.

The parts can be made of any suitable material and in different shapes or sizes.

The device can be used either as a sinker or as an efficient plug such as a bass plug. Since the device can be recovered even though the hook may become snagged on rocks, debris or the like, expensive equipment will not be lost, and the fisherman will be spared much annoyance. As shown in FIGURE 1 the device can be used as a sinker. The weight 15 can be made of lead or other material and the weight serves to give added weight to the end next to the hook so as to cause this end to tip downward and thus cause the water pressure to exert against the wings 25. This causes the sinker to raise up from the bottom without twisting. Without this weight 15 the device will not work properly. When used as a sinker as shown in FIGURE 1, when one wishes to reel in to change the bait or the like, by reeling in fast, the sinker will raise up about a forty-five degree angle so as to clear rocks, debris or the like. The line 17 is run or passed through the bore 16 and fastened in place, and this line 17 may be fastened to the member 20. Since the line 17 is heavier than the line or leader 21, it will be seen that if the hook 22 gets caught on a rock or the like, the line 21 will break easier than the line 17 so that the sinker will not be lost.

In FIGURE 5 the device is shown being used as a bass plug. Thus, a line such as the line 27 can be passed through one of the openings 24 so that the front end of the plug will tip upward when pulled through the water and this gives the plug a shimmy action. By putting the line 27 through a different opening, the plug will shimmy but not as much as when it is in the position shown in FIGURE 5 and by moving the line 27, the plug will not shimmy at all. Sometimes bass want the device one way and sometimes another, so that by changing the line from one opening to another, the user can find what the fish wish with only one plug and this saves the expense of having a lot of plugs for different actions.

Another advantage of this device is that the plugs are always carried in a box or other container detached so that they will not become tangled up as with plugs that have the hooks made to the plugs. A further advantage is that the line can be tied to the ring 20 and the hook can be tied to this ring with a lighter line or leader so that if the hook gets snagged up the smaller line will break but the plug will be saved.

The skirt such as the skirt 26 can be used when desired so as to make the device more attractive to fish such as bass.

Minor changes in shape, size and rearrangement of details coming within the field of invention claimed may be resorted to in actual practice, if desired.

I claim:

In a device of the character described, a body member including a rearwardly disposed cylindrical portion having a semi-circular shaped recess in the free end thereof, a forwardly disposed tapered rounded portion, a front pointed end, diametrically opposed wings extending from said tapered rounded portion, a spherical shaped weight mounted in the recess in the free end of the rear portion of the body member, an eye member extending rearwardly from said weight, there being a longitudinally extending bore in said body member, and a line extending through said bore, a second line extending rearwardly from said eye member, a hook connected to said second line, said first named line being stronger than said second named line, there being a plurality of angularly arranged spaced apart openings in the front of the body member communicating with the longitudinal axis of said bore, and said line adapted to be selectively extended through said openings, said wings being offset with respect to the longitudinal axis of the body member so that the front edges of said wings are elevated above a horizontal plane extending through the front pointed end of said body member.

References Cited in the file of this patent

UNITED STATES PATENTS

| | | |
|---|---|---|
| 1,390,458 | Moree | Sept. 13, 1921 |
| 2,167,334 | Hayes | July 25, 1939 |
| 2,498,815 | McVay | Feb. 28, 1950 |
| 2,605,577 | Waugler | Aug. 5, 1952 |
| 2,878,612 | Netherton | Mar. 24, 1959 |

OTHER REFERENCES

The Wise Fisherman's Encyclopedia, page 665, paragraph 2. Published by Wm. H. Wise and Co. 1951.